(12) United States Patent
Ghose et al.

(10) Patent No.: US 12,436,189 B2
(45) Date of Patent: Oct. 7, 2025

(54) FAST STRESSED-EYE CALIBRATION FOR RECEIVING TESTING

(71) Applicant: Tektronix, Inc., Beaverton, OR (US)

(72) Inventors: Subhankar Ghose, Bangalore (IN); Ankit Dash, Bangalore (IN); David M. Bouse, Camas, WA (US)

(73) Assignee: Tektronix, Inc., Beaverton, OR (US)

( * ) Notice: Subject to any disclaimer, the term of this patent is extended or adjusted under 35 U.S.C. 154(b) by 916 days.

(21) Appl. No.: 17/549,559

(22) Filed: Dec. 13, 2021

(65) Prior Publication Data

US 2022/0192486 A1    Jun. 23, 2022

(30) Foreign Application Priority Data

Dec. 18, 2020  (IN) ............................. 202021055267

(51) Int. Cl.
  *G01R 31/317*    (2006.01)
(52) U.S. Cl.
  CPC ............................... *G01R 31/3171* (2013.01)
(58) Field of Classification Search
  CPC ............................. G01R 31/3171; G06F 11/22
  USPC ........................................................ 702/69
  See application file for complete search history.

(56) References Cited

U.S. PATENT DOCUMENTS

| 7,516,030 B2* | 4/2009 | Miller ..................... H04L 1/205 |
| | | 702/69 |
| 2007/0136012 A1* | 6/2007 | Miller ................ G01R 31/3171 |
| | | 702/67 |
| 2008/0161714 A1* | 7/2008 | Ahonen ................. A61B 5/372 |
| | | 600/544 |

* cited by examiner

*Primary Examiner* — Aditya S Bhat
(74) *Attorney, Agent, or Firm* — Miller Nash LLP; Andrew J. Harrington (57) ABSTRACT

A method of generating a calibration signal includes setting a first parameter to an initial first value and a second parameter to an initial second value, generating an initial eye diagram using the initial first value and the initial second value, determining a first difference between a first dimension of the initial eye diagram and a target first dimension, and a second difference between a second dimension of the initial eye diagram and a second target dimension, estimating a next first value to cause the first difference to be zero, setting the first parameter to the next first value, generating a next eye diagram, repeating the estimating, setting, and generating until the first dimension of a most recent next eye diagram is within the first target dimension, setting a final first parameter value to a most recent next first value, setting a final second parameter value to the initial second value when the second dimension of the most recent next eye diagram is within the second target dimension, generating a calibration signal in accordance with the final first parameter value and the final second parameter value. A test and measurement device includes a user interface, at least one channel configured to connect to a device under test, a memory, and one or more processors configured to execute code to make the processors able to implement a process such as above.

20 Claims, 5 Drawing Sheets

| Index | SJ(ps) | SJ Setting (UI) | DMI (mV) | DMI Setting (mV) | Ampl (mV) | Ampl Setting (mV) | EW (ps) | EH (mV) |
|---|---|---|---|---|---|---|---|---|
| 1 | 3.125 | 0.116 | 10 | 24 | 800 | 592 | 11.335 | 18.324 |
| 2 | 3.125 | 0.116 | 10 | 24 | 800 | 592 | 11 | 18.287 |
| 3 | 3.125 | 0.116 | 10 | 24 | 800 | 592 | 11.23 | 17.804 |
| 4 | 3.125 | 0.116 | 10 | 24 | 800 | 592 | 10.932 | 18.364 |
| 5 | 3.125 | 0.116 | 10 | 24 | 800 | 592 | 10.932 | 17.545 |
| 6 | 3.125 | 0.116 | 10 | 24 | 800 | 592 | 11.371 | 17.406 |
| 7 | 3.125 | 0.116 | 10 | 24 | 800 | 592 | 10.772 | 17.561 |
| 8 | 3.125 | 0.116 | 10 | 24 | 800 | 592 | 10.881 | 18.434 |
| AVERAGE | 3.125 | 0.116 | 10 | 24 | 800 | 592 | 11.057 | 17.966 |
| 10 | 3.125 | 0.116 | 13.437 | 32 | 800 | 592 | 10.518 | 16.003 |
| 11 | 3.125 | 0.116 | 13.437 | 32 | 800 | 592 | 10.229 | 16.285 |
| 12 | 3.125 | 0.116 | 13.437 | 32 | 800 | 592 | 9.579 | 16.047 |
| 13 | 3.125 | 0.116 | 13.437 | 32 | 800 | 592 | 9.86 | 16.807 |
| 14 | 3.125 | 0.116 | 13.437 | 32 | 800 | 592 | 10.362 | 15.556 |
| 15 | 3.125 | 0.116 | 13.437 | 32 | 800 | 592 | 10.405 | 15.115 |
| 16 | 3.125 | 0.116 | 13.437 | 32 | 800 | 592 | 10.035 | 16.127 |
| 17 | 3.125 | 0.116 | 13.437 | 32 | 800 | 592 | 9.906 | 16.872 |
| 18 | 3.125 | 0.116 | 13.437 | 32 | 800 | 592 | 10.27 | 14.96 |
| 19 | 3.125 | 0.116 | 13.437 | 32 | 800 | 592 | 10.29 | 15.885 |
| AVERAGE | 3.125 | 0.116 | 13.437 | 32 | 800 | 592 | 10.145 | 15.966 |
| 21 | 3.48 | 0.128 | 13.437 | 32 | 800 | 592 | 9.446 | 15.834 |
| 22 | 3.48 | 0.128 | 13.437 | 32 | 800 | 592 | 9.767 | 15.727 |
| 23 | 3.48 | 0.128 | 13.437 | 32 | 800 | 592 | 9.507 | 15.739 |
| 24 | 3.48 | 0.128 | 13.437 | 32 | 800 | 592 | 9.918 | 15.832 |
| 25 | 3.48 | 0.128 | 13.437 | 32 | 800 | 592 | 9.954 | 15.029 |
| 26 | 3.48 | 0.128 | 13.437 | 32 | 800 | 592 | 9.609 | 15.423 |
| 27 | 3.48 | 0.128 | 13.437 | 32 | 800 | 592 | 9.521 | 15.095 |
| 28 | 3.48 | 0.128 | 13.437 | 32 | 800 | 592 | 9.737 | 14.792 |
| 29 | 3.48 | 0.128 | 13.437 | 32 | 800 | 592 | 9.758 | 15.162 |
| 30 | 3.48 | 0.128 | 13.437 | 32 | 800 | 592 | 9.891 | 14.793 |
| AVERAGE | 3.48 | 0.128 | 13.437 | 32 | 800 | 592 | 9.711 | 15.343 |
| SELECTED | 3.48 | 0.128 | 13.437 | 32 | 800 | 592 | 9.711 | 15.966 |

FIG. 5

FAST STRESSED-EYE CALIBRATION FOR RECEIVING TESTING

RELATED APPLICATIONS

This disclosure claims benefit of Indian Provisional Patent Application No. IN20202105567, titled "FAST STRESS-EYE CALIBRATION METHODOLOGY FOR RECEIVER TESTING IN PCIe GEN 5/6," filed Dec. 18, 2020, which is incorporated herein in its entirety.

TECHNICAL FIELD

This disclosure relates to calibration of test signals for stressed-eye receiver testing, more particularly to faster calibration methods.

BACKGROUND

High speed receiver testing, such as PCI Express devices operation at 32 Gigatransfers per second (GT/s), requires calibrating a stressed signal to single millivolt and single picosecond or less targets. A signal with "bad" characteristics, such as large Sinusoidal Jitter (SJ), Differential Mode Interference (DMI), InterSymbol Interference (ISI), etc., is referred to here as a "stressed eye" or a "stressed signal." The requirement is for a receiver to detect a data signal with a highly stressed eye for one or more of these characteristics. In order to meet these requirements, the receiver needs to be calibrated with these stressed eye signals. This requirement applies to numerous receiver testing methodologies including Bit Error Rate (BER) and Jitter Tolerance (JTOL) characterization. The final stage of this calibration process involves fine tuning some of the stress to bring the eye diagram within a desired target of eye width and eye heights for a specific BER.

Stressed eye calibration generally involves a time-consuming procedure extending over multiple hours, and has become a key customer pain point during calibration for receiver testing in high speed technologies. The specifications mandate the use of calibrated stress levels for compliance testing of devices under test. This forces the customer to go through a long-duration, stressed eye calibration process before actually performing any tests.

In one stressed eye calibration process, selected parameters are swept to meet the specified eye height and width requirements, typically the SJ and DMI parameters. The existing methods revolve around performing brute force search of the appropriate combination of the stress parameters through the entire search space of SJ and DMI and iterating through them to converge at the targeted eye parameters. This approach causes most of the long durations involved during the stressed eye calibration.

Embodiments of the disclosed apparatus and methods address shortcomings in the prior art.

BRIEF DESCRIPTION OF THE DRAWINGS

FIG. 5 shows an embodiment of a user interface for a test and measurement device.

DETAILED DESCRIPTION

High speed receiver testing, such as PCI Express devices operation at 32 Gigatransfers per second (GT/s), requires calibrating a "stressed eye signal" to single millivolt and single picosecond or less targets. In electronics signal testing, repetitively sampling a signal and applying it to the vertical input while the data rate is used to trigger a horizontal sweep results in what is referred to as an "eye pattern," "eye diagram" or "eye signal." An "open" eye signal corresponds to minimal signal distortion. A signal with "bad" characteristics, such as large Sinusoidal Jitter (SJ), Differential Mode Interference (DMI), InterSymbol Interference (ISI), Random Jitter (RJ), etc., is referred to here as a "stressed eye" or a "stressed signal." The requirement is for a receiver to detect a data signal with a highly stressed eye for one or more of these characteristics. In order to meet these requirements, the receiver needs to be calibrated with these signals that demonstrate stressed eye diagrams, referred to here as stressed eye signals.

The proposed methods of the embodiments described in this disclosure efficiently utilize data to arrive at the correct combination of stresses with the least number of iterations, enabling the customers to quickly start their tests. With these methods, the customers can complete the stressed eye calibration in less than an hour, which is a huge time saving.

The embodiments define an efficient method for completing this final step in stressed eye calibration using SJ and DMI to model cross-talk in a system for PCI Express generation 5. This technique is generalizable as to be extended to other technologies (e.g. IEEE, Thunderbolt, USB, Display Port . . . ) using different stresses to "close" the eye diagram, meaning that the eye diagram being used matches the parameters of the particular specifications for the stressed eye signal. This may include, but is not limited to, USB, with parameters SJ and amplitude, and PCI generation 3, with parameters Random Jitter (RJ) and DMI.

Figure 1:
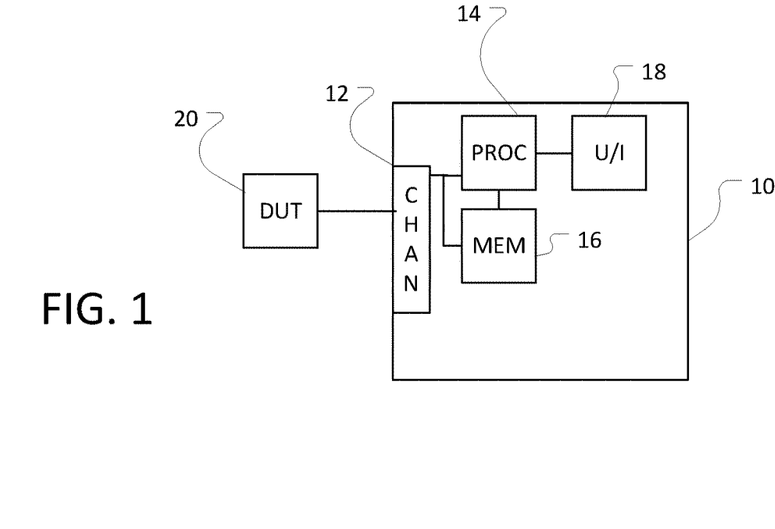
FIG. 1 shows an embodiment of a test and measurement device.

FIG. 1 shows an embodiment of a test and measurement device that can implement the methods of the invention as claimed. The test and measurement device performs the receiver testing (Rx Test). The process below occurs prior to the Rx Test.

The test and measurement device 10 may comprise an oscilloscope or other piece of test equipment. The device 10 may have input channels 12 to which probes or other types of testing connectors may connect to provide input data from a device under test (DUT) 20 for analysis and display. One or more processors such as 14 on the device may receive the data and operate on it for analysis. The one or more processors may receive inputs from a user interface such as 18 that provide parameters for tests to perform on the DUT. A memory 16 may store both the code to be executed by the processors and data from the DUT. The equipment may also include a waveform generator to generate subsequent eye diagrams.

The below discussion covers the use of SJ and DMI parameter selection to calibrate the stressed eye signal to be used to test a DUT to the PCI Express generation 5 specifications. However, as noted above, the two parameters could comprise different parameters. Generally, the width and height of an eye signal are two-dimensional functions of SJ and DMI, which the discussion below may refer to as S and D.

These are two-dimensional because variations in both S and D cause variations in both the width, W, and the height, H. Function w represents the width W, and function h represents H, meaning W=w(S,D), and H=h(S,D). The width and height may be referred to more generally as the first dimension and the second dimension to avoid limiting the methods to one or the other dimension. Similarly, the two parameters may be referred to as the first parameter and the second parameter, to avoid limiting the application of the methods to only SJ and DMI. In the below discussion, further terminology includes ΔW and ΔH as the increments in eye width and height, ΔS and ΔD as increments in SJ and DMI. The initial values of S and D will be referred to $S_{nominal}$ and $D_{nominal}$, and the target values for the width and height will be referred to as $w_{target}$ and $h_{target}$.

Figure 2:
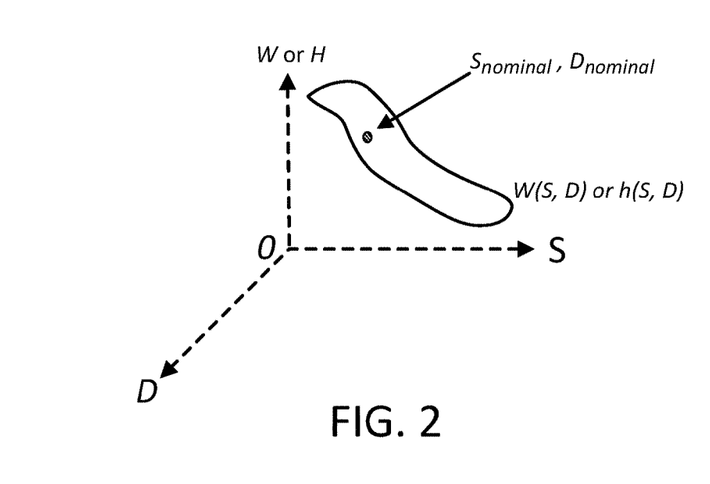
FIG. 2 shows a graphical representation of a variation in width or height for an eye signal as a function of two parameters.

FIG. 2 shows a variation in W on the surface in the figure. H varies similarly, but the shape might be different. If one assumes a point of interest denoted by ($S_{nominal}$, $D_{nominal}$) on the surface. Using a first order Taylor series approximation with partial derivatives for W and H at ($S_{nominal}$, $D_{nominal}$), one arrives at W≈W($S_{nominal}$, $D_{nominal}$)+ΔW. One can write ΔW using partial derivatives as:

$$\Delta W = \frac{\partial w}{\partial S}\Delta S + \frac{\partial w}{\partial D}\Delta D.$$

ΔS equals S−$S_{nominal}$, and ΔD equals D−$D_{nominal}$. Similarly, it is possible to write H≈h($S_{nominal}$, $D_{nominal}$)+ΔH, and the partial derivatives are:

$$\Delta H = \frac{\partial h}{\partial S}\Delta S + \frac{\partial h}{\partial D}\Delta D.$$

This then results in:

$$\begin{bmatrix} \Delta W \\ \Delta H \end{bmatrix} = \begin{bmatrix} \frac{\partial w}{\partial S} & \frac{\partial w}{\partial D} \\ \frac{\partial h}{\partial S} & \frac{\partial h}{\partial D} \end{bmatrix}_{nominal} \begin{bmatrix} \Delta S \\ \Delta D \end{bmatrix}.$$

Given the ΔW and ΔH requirements, one can use the following form to compute the additional stress levels ΔS and ΔD as shown below:

$$\begin{bmatrix} \Delta S \\ \Delta D \end{bmatrix} = \frac{1}{\left(\frac{\partial w}{\partial S}\cdot\frac{\partial h}{\partial D} - \frac{\partial w}{\partial D}\cdot\frac{\partial h}{\partial S}\right)} \begin{bmatrix} \frac{\partial h}{\partial D} & -\frac{\partial w}{\partial D} \\ -\frac{\partial h}{\partial S} & \frac{\partial w}{\partial S} \end{bmatrix}_{nominal} \begin{bmatrix} \Delta W \\ \Delta H \end{bmatrix} \quad (I)$$

The process then has ΔS and ΔD as computed above for the desired increments of ΔW and ΔH. In other words, if the desired amount of change in width W and height H is known, denoted by ΔW and ΔH, then using the expression (I) it is possible to determine the amount of change in SJ and DMI i.e. ΔS and ΔD respectively, that is required to achieve the desired increments of ΔW and ΔH.

This calculation makes a leap towards achieving the efficiency in the procedure described here. Using this expression, the intermediate search steps in the brute force approach currently used are eliminated. This results in increased speed of convergence towards the specified eye targets during calibration. The expression enables the process to make great progress towards the specified eye width and height targets in a single iteration.

Figure 3:
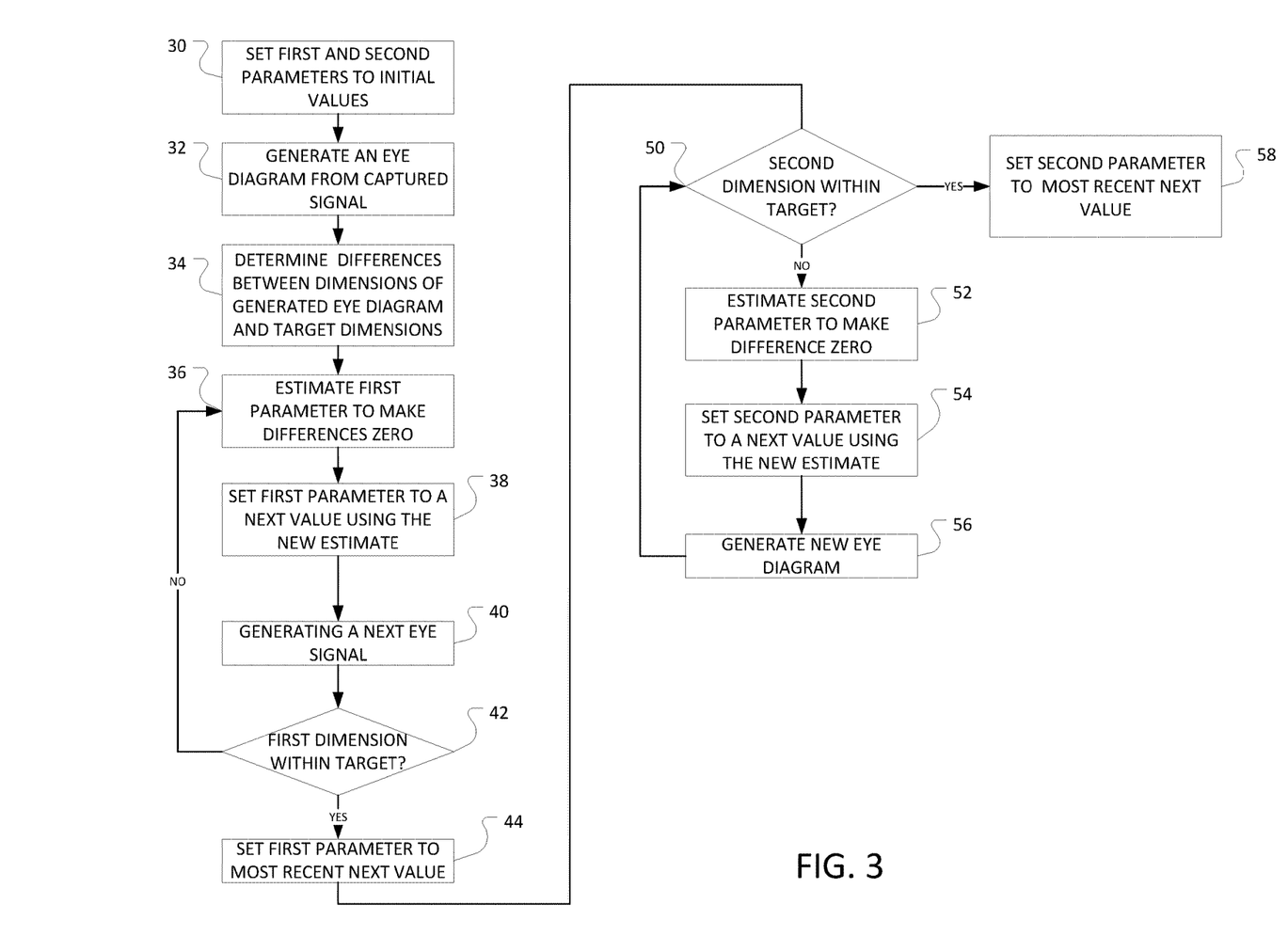
FIG. 3 shows a flowchart of an embodiment of a method to adjust parameters for an eye signal to meet testing requirements.

The below discussion will work through the process in general terms, using the example of S and D. FIG. 3 shows a flowchart of an embodiment of this process. The process begins at 30, with the first and second parameters set to initial values. In terms of the example, the S and D parameters at the start of stressed eye calibration are ($S_{nominal}$, $D_{nominal}$) for which let us consider ($w_{nominal}$, $h_{nominal}$) to be the measured eye-width and height for the eye diagram generated at 32.

At 34, the process determines differences between the eye height and width resulting from the first eye diagram generated at 32 and the eye height and width for the target eye diagram, referred to here as the target eye height and width:

$$(w_{SpecTarget}-w_{nominal}, h_{SpecTarget}-h_{nominal}) \equiv (\Delta W_{First\ Diff}, \Delta H_{First\ Diff}).$$

The expression above is then used to arrive at the ($\Delta S_{First\ Diff}$, $\Delta D_{First\ Diff}$) for the corresponding coverage of ($\Delta W_{First\ Diff}$, $\Delta H_{First\ Diff}$).

One of the constraints put in the proposed algorithm is to minimize the amount of variation in SJ towards closure of the calibration. The process followed in the process is to map $\Delta S_{First\ Diff}$ obtained from the first set of computation to an additional DMI level, denoted by $\Delta D_{Mapped}$ on top of $\Delta D_{First\ Diff}$ that resulted from the first computation, using the expression in (II) below:

$$\Delta D_{Mapped} = \left(\Delta S_{FirstDiff} * \frac{\partial w}{\partial S}\right)/\frac{\partial w}{\partial D} \quad (II)$$

At the end of first computation, the stress level of ($S_{nominal}$, $D_{nominal}$+$\Delta D_{First\ Diff}$+$\Delta D_{Mapped}$) are determined. This estimation of the first parameter occurs at 36 and it is used to perform the measurements of eye height and eye width at 38. In the example, this would be the DMI parameter, as it is the first parameter to be adjusted. In other examples and embodiments it could also be SJ.

The above process repeats at 38, 40 and 42, maintaining the SJ at $S_{nominal}$ and only varying DMI by setting it to the most recent estimated value at 38 until the eye height comes within the specified target at 42. This then causes the stress levels at this point be denoted by ($S_{nominal}$, $D_{Final}$), where the final value of the first parameter, in this case, the D parameter is set to the most recent next value from the process above at 44. The eye height is now within the specified target.

At this point in the calibration flow, at 50, there are two possibilities for eye width. If the eye width target is also met, the process sets the second parameter, in this case S, to the most recent next value at 58. In the case of where the eye width target is met the first time, the S parameter is set to $S_{nominal}$, and the final values are ($S_{nominal}$, $D_{Final}$).

However, if the eye width target, also referred to as the second dimension target, is not met with those parameters, at 50, the process continues to 52 and the process estimates the second parameter value that would make the difference zero at 52. In the example, S, is estimated based upon the differences between the current eye signal and the targets. The differences here are referred to as "residual" differences. In case the eye width target is not met and a residual width, $\Delta W_{Residual}$, remains to be covered, then expression (III)

below is used to obtain the vector $[\Delta S_{Residual}, \Delta D_{Residual}]$ as follows (As in expression (I) above):

$$\begin{bmatrix} \Delta S_{Residual} \\ \Delta D_{Residual} \end{bmatrix} = \frac{1}{\left(\frac{\partial w}{\partial S} \cdot \frac{\partial h}{\partial D} - \frac{\partial w}{\partial D} \cdot \frac{\partial h}{\partial S}\right)} \begin{bmatrix} \frac{\partial h}{\partial D} & -\frac{\partial w}{\partial D} \\ -\frac{\partial h}{\partial S} & \frac{\partial w}{\partial S} \end{bmatrix}_{nominal} \begin{bmatrix} \Delta W_{residual} \\ \Delta H_{residual} \end{bmatrix} \quad (III)$$

Note that at this stage in calibration since the eye height is already met $\Delta H_{Residual}$ is kept at a very small value of 0.25 mV in this example. Due to this fact, $\Delta D_{Residual}$ is mapped on to $\Delta S_{Mapped}$ as earlier to avoid any further change in DMI and therefore the eye height. At 54, the second parameter is set to a next value using the new estimate from 52. The eye measurement is carried out using the stresses with the settings $(S_{nominal} + \Delta S_{Mapped}, D_{Final})$ for new eye signals at 56. The above process is repeated until the eye width falls within the specified target and convergence is achieved at 50, and then the second parameter is set to its final value at 58.

Figure 4A:
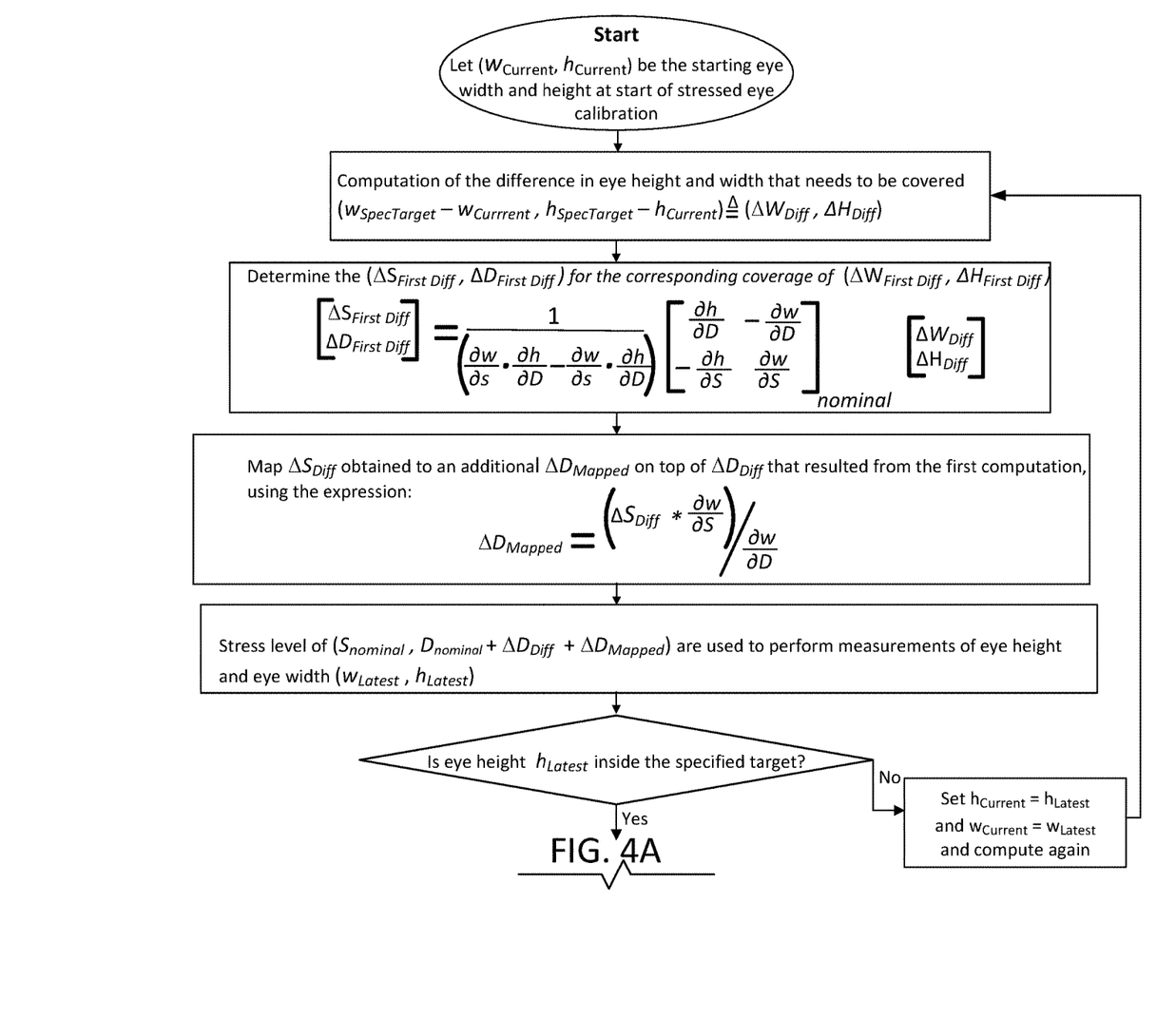
FIGS. 4A and 4B show a flowchart of an embodiment of a method to adjust parameters for an eye signal to meet testing requirements.
Figure 4B:
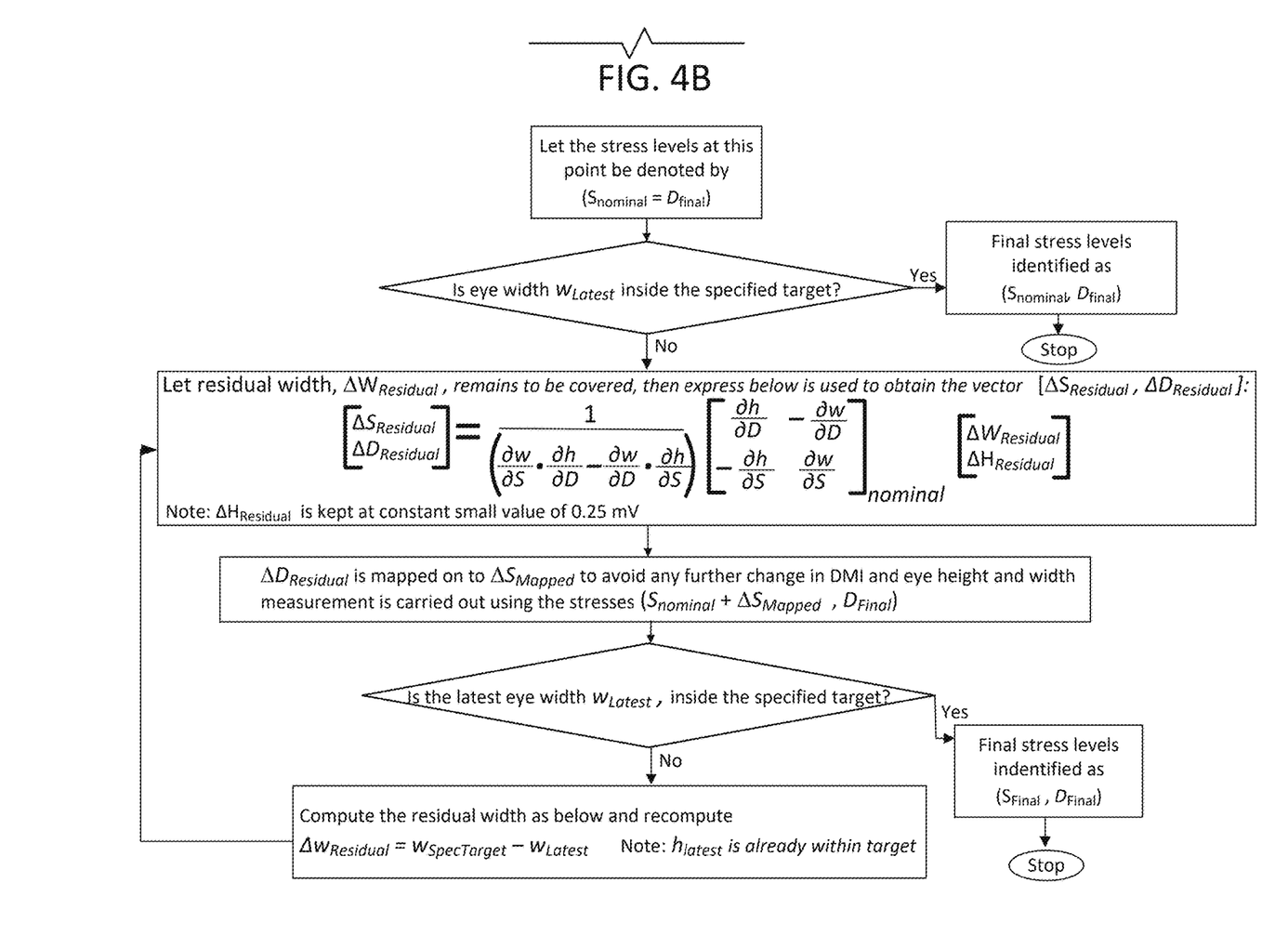

FIGS. 4A and 4B shows a flowchart of the above method applied to the embodiment of SJ and DMI, corresponding to the process above in the more general case.

In this manner, the calibration signal to be used in testing can be obtained much more quickly than in current processes. The expression I above puts this process very close to where the parameters need to be to achieve the desired signal. In many cases the first part of the process only occurs once, in others it occurs only twice. The second part of the process is often not even necessary. This saves the user hours of time and allows the actual testing to occur much more quickly than previously.

The users may not see any of the above process. An example of a user interface on a test and measurement device is shown in FIG. 5. The system may offer a 'calibrate' or other selection, or the user may put in the initial values for the two parameters the users choses and then the system will provide the 'answer' on the user interface so the user can then proceed to the test.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

EXAMPLES

Illustrative examples of the disclosed technologies are provided below. An embodiment of the technologies may include one or more, and any combination of, the examples described below.

Example 1 is a test and measurement device, comprising: a user interface; at least one channel configured to connect to a device under test; a memory; and one or more processors configured to execute code that cause the one or more processors to: set a first parameter to an initial first value and a second parameter to an initial second value; generate an initial eye diagram using the initial first value and the initial second value; determine a first difference between a first dimension of the initial eye diagram and a target first dimension, and a second difference between a second dimension of the initial eye diagram and a second target dimension; estimate a next first value to cause the first difference to be zero; set the first parameter to the next first value; generate a next eye diagram; repeat the estimating, setting, and generating until the first dimension of a most recent next eye diagram is within the first target dimension;

set a final first parameter value to a most recent next first value; set a final second parameter value to the initial second value when the second dimension of the most recent next eye diagram is within the second target dimension; and generate a calibration signal in accordance with the final first parameter value and the final second parameter value.

Example 2 to is the device of Example 1, wherein, when the second dimension of the most recent next eye diagram is not within the second target dimension, the code further causes the one or more processors to: estimate a next second value to cause the second difference to be zero; set the second parameter to the next second value; generate a next eye diagram; repeat the estimating, setting, and generating until the second dimension of the most recent next eye diagram is within the second target dimension; and set the final second parameter value to a most recent next second value.

Example 3 is the device of Example 2, wherein the code further causes the one or more processors to set a difference between the first dimension and the target first dimension to a constant value.

Example 4 is the device of any of Examples 1 through 3, wherein the code to cause the one or more processors to estimate the next first value for the first parameter to cause the first difference to be zero comprises code to cause the one or more processors to: determine a change in the first parameter and the second parameter correlating to the first difference and the second difference; and estimate the first parameter based upon the change in the first parameter.

Example 5 is the device of any of Examples 1 through 4, wherein the code that causes the one or more processors to estimate the first parameter comprises code to cause the one or more processors to estimate the first parameter based upon the change in the first parameter and a mapping of a change in the second parameter to the first parameter.

Example 6 is the device of any of Examples 1 through 5, wherein the repeating only occurs once and the final second parameter value is set to the initial second value.

Example 7 is the device of any of Examples 1 through 6, wherein the first parameter is differential mode interference and the second parameter is sinusoidal jitter.

Example 8 is the device of any of Examples 1 through 7, wherein the first parameter is sinusoidal jitter and the second parameter is amplitude.

Example 9 is the device of any of Examples 1 through 8, wherein the first parameter is random jitter and the second parameter is differential mode interference.

Example 10 is a method of generating a calibration signal, comprising: setting a first parameter to an initial first value and a second parameter to an initial second value; generating an initial eye diagram using the initial first value and the initial second value; determining a first difference between a first dimension of the initial eye diagram and a target first dimension, and a second difference between a second dimension of the initial eye diagram and a second target dimension; estimating a next first value to cause the first difference to be zero; setting the first parameter to the next first value; generating a next eye diagram; repeating the estimating, setting, and generating until the first dimension of a most recent next eye diagram is within the first target dimension; setting a final first parameter value to a most recent next first value; setting a final second parameter value to the initial second value when the second dimension of the most recent next eye diagram is within the second target dimension; and generating a calibration signal in accordance with the final first parameter value and the final second parameter value.

Example 11 is the method of Example 10, further comprising, when the second dimension of the most recent next eye diagram is not within the second target dimension: estimating a next second value to cause the second difference to be zero; setting the second parameter to the next second value; generating a next eye diagram; repeating the estimating, setting, and generating until the second dimension of the most recent next eye diagram is within the second target dimension; and setting the final second parameter value to a most recent next second value.

Example 12 is the method of Example 11, further comprising setting a difference between the first dimension and the target first dimension to a constant value.

Example 13 is the method of any of Examples 10 through 12, wherein estimating the next first value for first parameter causes the first difference to be zero comprises: determining a change in the first parameter and the second parameter correlating to the first difference and the second difference; and estimating the first parameter based upon the change in the first parameter.

Example 14 is the method of Example 13, wherein estimating the first parameter comprises estimating the first parameter based upon the change in the first parameter and a mapping of a change in the second parameter to the first parameter.

Example 15 is the method of any of Examples 10 through 14, wherein the repeating only occurs once and the final second parameter value is set to the initial second value.

Example 16 is the method of any of Examples 10 through 15, wherein the first parameter is differential mode interference and the second parameter is sinusoidal jitter.

Example 17 is the method of any of Examples 10 through 16, wherein the first parameter is sinusoidal jitter and the second parameter is amplitude.

Example 18 is the method of any of Examples 10 through 17, wherein the first parameter is random jitter and the second parameter is differential mode interference.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A test and measurement device, comprising:
a user interface;
at least one channel configured to connect to a device under test;
a memory; and
one or more processors configured to execute code that cause the one or more processors to:
set a first parameter to an initial first value and a second parameter to an initial second value;
generate an initial eye diagram using the initial first value and the initial second value, where generating an eye diagram comprises:
receiving a signal;
repetitively sampling the signal;
applying the sample to a vertical input while triggering a horizontal sweep to generate the initial eye diagram; and
determine a first difference between a first dimension of the initial eye diagram and a target first dimension, and a second difference between a second dimension of the initial eye diagram and a second target dimension;

estimate a next first value to cause the first difference to be zero;
set the first parameter to the next first value;
generate a next eye diagram;
repeat the estimating, setting, and generating until the first dimension of a most recent next eye diagram is within the first target dimension;
set a final first parameter value to a most recent next first value;
set a final second parameter value to the initial second value when the second dimension of the most recent next eye diagram is within the second target dimension;
generate a calibration signal in accordance with the final first parameter value and the final second parameter value;
provide the calibration signal to a user through the user interface with a least number of repetitions and less time than previously approaches;
use the calibration signal to calibrate the device under test for testing.

2. The device as claimed in claim 1, wherein, when the second dimension of the most recent next eye diagram is not within the second target dimension, the code further causes the one or more processors to:
estimate a next second value to cause the second difference to be zero;
set the second parameter to the next second value;
generate a next eye diagram;
repeat the estimating, setting, and generating until the second dimension of the most recent next eye diagram is within the second target dimension; and
set the final second parameter value to a most recent next second value.

3. The device as claimed in claim 2, wherein the code further causes the one or more processors to set a difference between the first dimension and the target first dimension to a constant value.

4. The device as claimed in claim 1, wherein the code to cause the one or more processors to estimate the next first value for the first parameter to cause the first difference to be zero comprises code to cause the one or more processors to:
determine a change in the first parameter and the second parameter correlating to the first difference and the second difference; and
estimate the first parameter based upon the change in the first parameter.

5. The device as claimed in claim 4, wherein the code that causes the one or more processors to estimate the first parameter comprises code to cause the one or more processors to estimate the first parameter based upon the change in the first parameter and a mapping of a change in the second parameter to the first parameter.

6. The device as claimed in claim 1, wherein the repeating only occurs once and the final second parameter value is set to the initial second value.

7. The device as claimed in claim 1, wherein the first parameter is differential mode interference and the second parameter is sinusoidal jitter.

8. The device as claimed in claim 1, wherein the first parameter is sinusoidal jitter and the second parameter is amplitude.

9. The device as claimed in claim 1, wherein the first parameter is random jitter and the second parameter is differential mode interference.

10. The test and measurement device as claimed in claim 1, wherein the test and measurement device further comprises a waveform generator.

11. A method of generating a calibration signal, comprising:
setting a first parameter to an initial first value and a second parameter to an initial second value;
generating an initial eye diagram using the initial first value and the initial second value, wherein generating an eye diagram comprises:
receiving a signal;
repetitively sampling the signal; and
applying the sample to a vertical input while triggering a horizontal sweep to generate the initial eye diagram;
determining a first difference between a first dimension of the initial eye diagram and a target first dimension, and a second difference between a second dimension of the initial eye diagram and a second target dimension;
estimating a next first value to cause the first difference to be zero;
setting the first parameter to the next first value;
generating a next eye diagram;
repeating the estimating, setting, and generating until the first dimension of a most recent next eye diagram is within the first target dimension;
setting a final first parameter value to a most recent next first value;
setting a final second parameter value to the initial second value when the second dimension of the most recent next eye diagram is within the second target dimension;
generating a calibration signal in accordance with the final first parameter value and the final second parameter value;
providing the calibration signal to a user through a user interface with a least number of repetitions and far less time than previously possible; and
using the calibration signal to calibrate the device under test for testing.

12. The method as claimed in claim 11, further comprising, when the second dimension of the most recent next eye diagram is not within the second target dimension:
estimating a next second value to cause the second difference to be zero;
setting the second parameter to the next second value;
generating a next eye diagram;
repeating the estimating, setting, and generating until the second dimension of the most recent next eye diagram is within the second target dimension; and
setting the final second parameter value to a most recent next second value.

13. The method as claimed in claim 12, further comprising setting a difference between the first dimension and the target first dimension to a constant value.

14. The method as claimed in claim 11, wherein estimating the next first value for first parameter causes the first difference to be zero comprises:
determining a change in the first parameter and the second parameter correlating to the first difference and the second difference; and
estimating the first parameter based upon the change in the first parameter.

15. The method as claimed in claim 14, wherein estimating the first parameter comprises estimating the first parameter based upon the change in the first parameter and a mapping of a change in the second parameter to the first parameter.

16. The method as claimed in claim 11, wherein the repeating only occurs once and the final second parameter value is set to the initial second value.

17. The method as claimed in claim 11, wherein the first parameter is differential mode interference and the second parameter is sinusoidal jitter.

18. The method as claimed in claim 11, wherein the first parameter is sinusoidal jitter and the second parameter is amplitude.

19. The method as claimed in claim 11, wherein the first parameter is random jitter and the second parameter is differential mode interference.

20. The method as claimed in claim 11, wherein receiving a signal comprises receiving a signal from a waveform generator.

* * * * *